Feb. 9, 1926.  
W. LANGERAK  
WEIGHING DEVICE  
Filed May 29, 1924  
1,572,658  
2 Sheets-Sheet 1
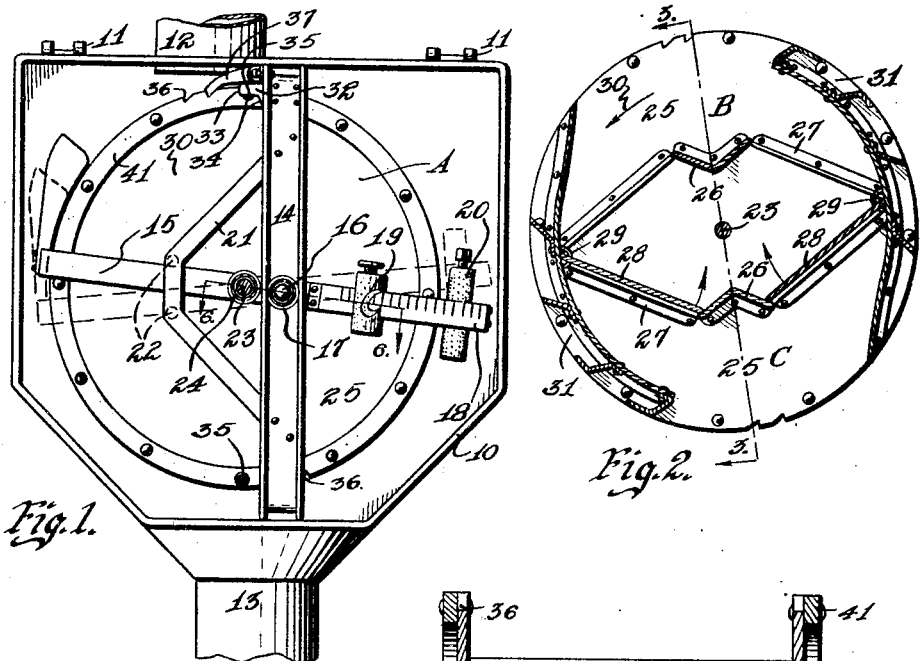
Fig.1.  
Fig.2.
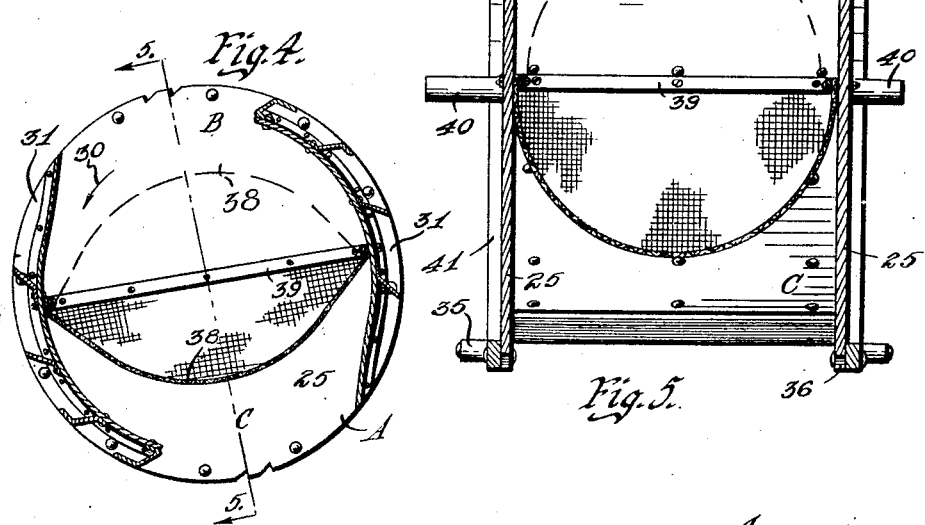
Fig.4.  
Fig.5.
Witness  
R. Rusher
Inventor  
Wiggert Langerak  
by Bair & Freeman Attorney

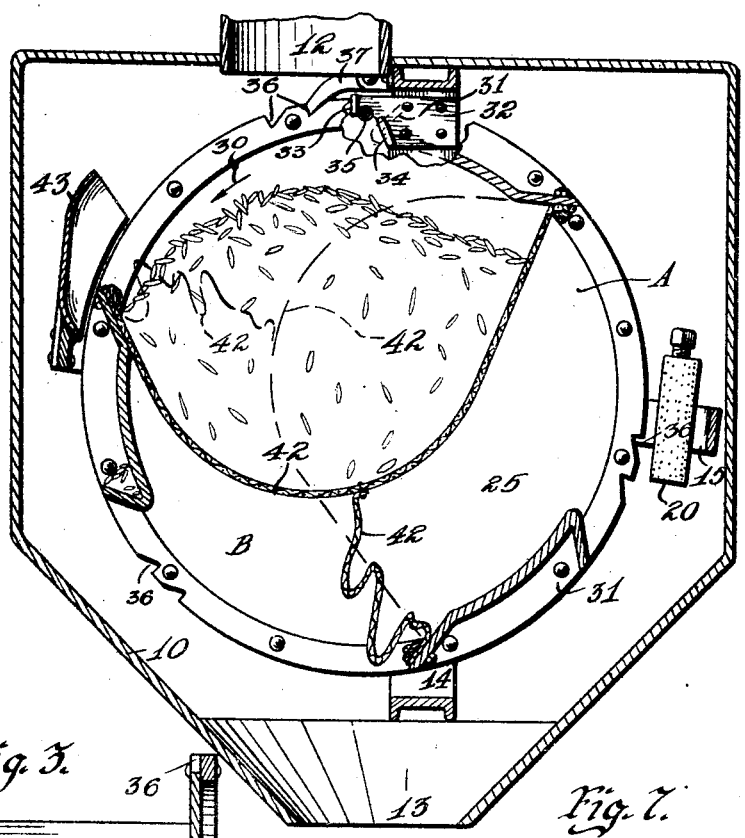
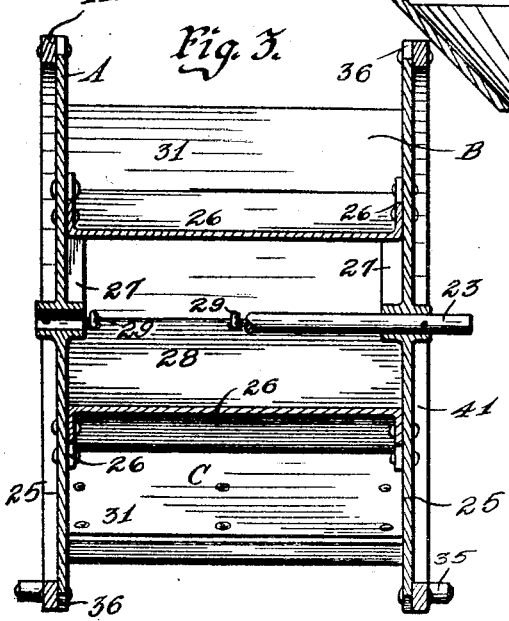
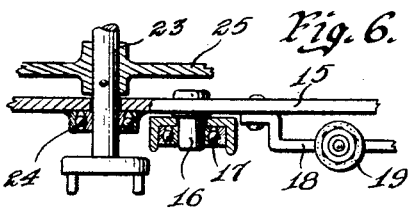

Patented Feb. 9, 1926.

1,572,658

UNITED STATES PATENT OFFICE.

WIGGERT LANGERAK, OF PELLA, IOWA, ASSIGNOR OF ONE-HALF TO MEYER LANGERAK, OF PELLA, IOWA.

WEIGHING DEVICE.

Application filed May 29, 1924. Serial No. 716,815.

*To all whom it may concern:*

Be it known that I, WIGGERT LANGERAK, a citizen of the United States, residing at Pella, in the county of Marion and State of Iowa, have invented a certain new and useful Weighing Device, of which the following is a specification.

The object of my invention is to provide a weighing device of simple, durable and comparatively inexpensive construction.

More particularly, my invention relates to a weighing device having a rotor therein provided with a movable bottom so that the capacity of the pocket which receives the commodity to be weighed can be increased automatically.

Still a further object is to provide a weighing device having a rotor provided with a flexible bottom for forming the rotor into a plurality of pockets, the flexible element having looseness so that it can move to position where it will overlap the unused pocket for permitting the capacity of the pocket being filled to be increased.

Still a further object is to provide a weigher rotor having a plurality of pockets therein provided with flexible bottoms movable to position where portions of the pockets overlap each other.

Still a further object is to provide a rotor having a bottom therein mounted for movement across the interior thereof for making each pocket of the rotor, when being filled, to have a capacity greater than the number of pockets divided into the area of the rotor itself.

Still a further object is to provide an auxiliary pocket or pockets on the rotor for catching the grain during the time the rotor is moved from one filling position to another filling position.

My present invention, is an improvement upon my co-pending application for patent filed April 17, 1924, Serial No. 707,095 on a grain weigher.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of my improved weighing device with part of the casing thereof removed.

Figure 2 is a central, vertical view through the weigher rotor, showing the movable bottom and auxiliary pockets thereof.

Figure 3 is a sectional view taken on line 3—3 of Figure 2.

Figure 4 is a sectional view through a slightly modified form of weigher rotor.

Figure 5 is a sectional view taken on line 5—5 of Figure 4.

Figure 6 is a detail, sectional view taken on line 6—6 of Figure 1 showing a portion of the weigher frame and the mounting of the weigher rotor; and Figure 7 is a central, sectional view through a slightly different form of weigher rotor.

In the accompanying drawings I have used the reference numeral 10 to indicate generally a casing in which my automatic weighing device is mounted. The casing 10 may be provided with a hinged cover member, not shown.

Hinge connections 11 are formed on the casing 10 whereby the cover member may be connected thereto.

An inlet pipe 12 leads from the threshing machine to the casing 10 and discharges the grain from the threshing machine into the casing and weigher, as will hereinafter be more fully explained.

The lower part of the casing 10 is formed with an inclined bottom at the lower end of which is an opening for permitting the discharge pipe 13 to be communicated therewith.

My improved weighing device includes a frame 14 securely mounted in the casing 10. A weigher frame 15 is pivotally supported on the frame 14 on the short shafts 16. The shafts 16 extend through roller bearings 17.

The weigher frame is provided with a suitable scale element 18 having a sliding scale member 19 thereon.

A counter weight 20 is also mounted upon the weigher frame 14.

The parts just described are all clearly shown in my co-pending application herein referred to.

A bracket 21 extends from the frame 14 and has a pair of stop pins 22 thereon which are spaced apart and receive a portion of the weigher frame 15 therebetween for limiting the amount of pivotal movement of the weigher frame.

Mounted upon the weigher frame by means of a shaft 23 is a weigher rotor A. The weigher frame 15 is provided with roller bearings 24 through which the shaft 23 extends.

From the construction of the parts just described, it will be seen that the weigher frame 15 is mounted for rotation on the short shafts 16 in the frame 14 and that the weigher rotor A is mounted for rotation on the shaft 23 mounted on the weigher frame 15.

The axis of the weigher frame and the axis of the weigher rotor are spaced somewhat apart as shown in Figure 1 of the drawings.

The weigher rotor A consists of a pair of side walls 25, which are spaced apart and fixed to the shaft 23.

A pair of angle irons 26 extend between the two side walls 25 and connect them together.

Angle irons 27 are also mounted on the side walls 25 and serve as stops for the movable bottom members 28. The bottom members 28 are hinged at their outer ends by means of the loops 29 to the rotor A.

The lower or inner ends of the bottom members 28 are adapted to strike against the outer edges of the angle irons 26, as clearly shown in Figure 2 of the drawings.

The movable bottom members 28 cause the rotor A to be divided into two pockets B and C. The pocket B is shown in Figure 2 in position to be filled with grain.

It will be noted that there are two sets of angle irons 27 secured to the side walls 26, the purpose of which will be hereinafter more fully set forth.

The incoming grain through the inlet pipe or chute 12 passes into the pocket B and is retained therein by the lower angle iron 26 and the two movable bottoms 28. When the pocket B in the rotor A becomes filled and the grain reaches a predetermined weight, then the rotor will rotate in the direction indicated by the arrow 30, as will hereinafter be more fully set forth.

The pocket C will then be brought to position where it will be below the inlet pipe 12, and in that case, the movable bottom members 28 will swing on their hinges 29 to position where they will rest against the other set of angle iron stops 27, and when in this position the pocket C will then be increased in size so that its size will be the same as that of the original pocket B and original pocket B will be decreased in size so that it will be the same as original pocket C.

The movable bottom members 28 move across the interior of the rotor for increasing the capacity of the pocket to be filled, whereby the maximum filling capacity is obtained from a comparatively small rotor. The movable bottom members 28 swing by gravity as the rotor A is rotated.

It will therefore be clearly noted that the pockets overlap each other and that the pocket being filled is comparatively large compared to the pocket that is being emptied.

A number of auxiliary pockets 31 are formed on the sides of the rotor A and catch the grain as the rotor moves from one position to another of its positions.

The pockets 31, catch the grain that falls from the elevator spout while the rotor is turning from one weighing position to the next. The grain thus caught is, of course, weighed with the grain on the inside of the rotor. The provision of the pockets 31 eliminates the necessity for using a mechanical flapper or valve or closure in the elevator spout, which might otherwise be necessary for stopping the flow of grain between weighing operations.

I will now describe in detail, the operation of the weigher which limits movement of the rotor A.

A plate 32 is mounted on the frame 14 and is provided with a pair of spaced lugs 33 and 34.

A stop 35 is mounted on the rotor A, which engages the upper plate 35 for retaining it in filling position.

In order to prevent the rotor from any possible backward rotation, I provide notches 36 in the rotor A, which are engaged by a locking pawl 37 pivotally mounted on the frame 14.

When the pocket, being filled, reaches a predetermined amount, the weigher frame swings to a position shown in dotted lines in Figure 1 of the drawings, thereby moving the stop roller 35 downwardly to position where it clears the lower edge of the stop 33, and thereafter it is permitted to rotate to emptying position.

Another stop roller 35 is then brought to position where it engages the stop 33 for positioning another of the pockets to be secured.

It will be understood that the weigher frame 15 will swing back to its solid line position, as shown in Figure 1, as soon as the contents of the rotor is emptied and to insure against any possible continued rotation of the weigher rotor. In case the weigher frame does not properly operate, I employ the stop 34, which would be engaged by the stop roller 35.

The locking pawl 37 in that case would drop into the forward notch 36.

It may be here mentioned that the stop 34 is only intended as a safety in case the weigher frame did not properly function for insuring the rotor to be raised sufficiently to bring the stop roller 35 into engagement with the stop 33.

When the weigher rotor becomes filled, to its predetermined amount, then of course, the weigher frame will swing causing the stop roller 35 to be moved downwardly until it clears its stop 33.

In Figures 4 and 5 of the drawings, I have shown in place of hinged bottoms 28, a flexible bottom 38, which is retained on its sides and ends by means of a frame 39, which is fixed to the side walls 25 of the rotor A. In this particular case, short shafts 40 are used in place of the single shaft 23.

The flexible bottom 38 is of such looseness as to permit it to sag when one pocket is being filled so that it extends into the portion of the other pocket which is in empty position.

In Figure 5 of the drawings, I have shown in dotted lines the position of the bottom 38 when the rotor A has been moved through 180 degrees from its full line position there shown.

The operation of the rotor in this case being identical with the rotor A, just described.

Side auxiliary pockets 31 are also used with the rotor having the flexible bottom 38 therein.

It will be noted that the flexible bottom 38 moves across the interior of the rotor A for increasing the capacity of the pocket to be filled.

The side walls 25 of the rotor A may be reinforced with a ring 41 secured to the outer edge of the walls 25.

In Figure 7 of the drawings, I have shown a flexible bottom 42 for dividing the rotor A into three compartments instead of two.

The auxiliary side pockets 31 are also used in this form of rotor.

The flexible bottom 42 will assume the position shown in solid lines shown in Figure 7, when one of its pockets is being filled and will assume the position shown in dotted lines when the next adjacent pocket is being filled.

It will, therefore, be seen that the pockets overlap each other and that the pocket being filled has a greater capacity than the pockets being emptied.

I have shown a catch wall 43 on the weigher frame 15, which will prevent any grain from splashing if it is discharged through the pipe 12 into the rotor A.

In case any grain does strike against the catch wall, 43, it will be discharged into one of the auxiliary side pockets 31, and remain therein until the rotor A rotates a sufficient distance to bring another pocket to filling position, at which time the auxiliary pocket will be emptied.

When three pockets are used in the rotor A, then it revolves only 120 degrees for bringing the next adjacent pocket to filling position.

The advantage of my weigher rotor resides in the fact that I am able to use a rotor of comparatively small size, and yet get pockets, which when in filling position will give me a maximum capacity.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A weigher rotor having a plurality of pockets therein, a flexible element forming the bottom of said pockets whereby the flexible element may when the rotor is in one position partially extend into the space previously occupied by another of the pockets and when in another position extend into the space of a different pocket.

2. An automatic weigher comprising a supporting frame, a weigher frame mounted thereon and a weigher rotor mounted in said weigher frame, said weigher rotor having a plurality of pockets therein provided with flexible bottoms, movable to position where portions of the pockets lie in the space previously occupied by another pocket.

3. A weigher rotor comprising a pair of spaced side walls, a flexible element secured to said side walls for dividing the rotor into pockets, the flexible element forming the bottom of said pockets, said flexible element having looseness so as to permit it to sag as and for the purposes stated.

4. A weigher rotor comprising a pair of spaced side walls, a flexible element secured to said side walls for dividing the rotor into pockets, one surface of the flexible element serving as the bottom for one pocket and the other surface serving as the bottm for the other pocket, said flexible element having looseness so as to permit it to sag when the rotor is in either of its positions where it will extend into the space previously occupied by the other pocket for increasing the capacity of the pockets.

5. In a weighing device a rotor having side walls, a bottom therein for dividing the rotor into pockets, said bottom being mounted for movement across the interior of the rotor for increasing the capacity of the pocket being filled.

6. In a weighing device a rotor having casing walls, a pocket forming bottom in said rotor, adapted to move across the interior for giving maximum capacity to the pocket being filled and for forming a pocket on both sides.

7. In a weighing device, a rotor having casing walls, a bottom therein for forming a pocket secured to the casing walls at its edges and having its central portion movable across the interior of the rotor, whereby the pocket will have maximum capacity when being filled.

8. An automatic weigher comprising a supporting frame, a weigher frame mounted thereon and a weigher rotor mounted in said weigher frame, said weigher rotor having a plurality of pockets therein provided with a bottom movable to position where portions of the pockets lie in the space previously occupied by another pocket.

9. In a weighing device a rotor having side walls, a movable bottom therein for dividing the rotor into pockets, said bottom being mounted for movement across the interior of the rotor for increasing the capacity of the pocket being filled and end pockets on said rotor for use during movement of the rotor from one position to another of its positions.

10. In a weighing device a rotor having side walls, a movable hinged bottom therein for dividing the rotor into pockets, said bottom being mounted for movement across the interior of the rotor for increasing the capacity of the pocket being filled and end pockets on said rotor for use during movement of the rotor from one position to another of its positions.

11. In a weighing device a rotor having side walls, a flexible bottom therein for dividing the rotor into pockets, said bottom being mounted for movement across the interior of the rotor for increasing the capacity of the pocket being filled and end pockets on said rotor for use during movement of the rotor from one position to another of its positions.

12. In an automatic weigher, a casing, a weigher rotor therein having main grain receiving pockets, said rotor having auxiliary pockets for receiving grain during the rotary movement of the rotor.

13. In an automatic weigher, a casing, a rotatably mounted grain receiving and weighing device therein, having on its exterior pockets to receive grain during the rotation of the rotatably mounted member.

14. In an automatic weigher, a casing, a weigher rotor therein having main grain receiving pockets, said rotor having auxiliary pockets for receiving grain during the rotary movement of the rotor and means adjacent the rotor for deflecting grain into the auxiliary pockets.

15. In an automatic weigher, a casing, a weigher rotor therein having main grain receiving pockets, said rotor having auxiliary pockets for receiving grain during the rotary movement of the rotor and means for holding the weigher rotor against rotary movement until the weigher rotor is filled to a predetermined amount.

16. In an automatic weigher, a casing, a weigher rotor therein having main grain receiving pockets, said rotor having auxiliary pockets for receiving grain during the rotary movement of the rotor and means for holding the weigher rotor against rotary movement until the weigher rotor is filled to a predetermined amount, said rotor being mounted for vertical movement and said means comprising a stop on the rotor and fixed stops for coacting with the first stop in either the raised or lowered position of the rotor.

17. In an automatic weigher, a casing, a weigher rotor therein having main grain receiving pockets, said rotor having auxiliary pockets for receiving grain during the rotary movement of the rotor and means for holding the weigher rotor against rotary movement until the weigher rotor is filled to a predetermined amount, said rotor being mounted for vertical movement and said means comprising a stop on the rotor and fixed stops for coacting with the first stop in either the raised or lowered position of the rotor, said fixed stops being spaced apart and one above the other and in advance thereof so that the first stop passes between said fixed stops.

Des Moines, Iowa, May 23, 1924.

WIGGERT LANGERAK.